United States Patent
Uenaka et al.

(10) Patent No.: US 11,707,841 B2
(45) Date of Patent: Jul. 25, 2023

(54) AUTOMATED FIBER BUNDLE PLACEMENT APPARATUS

(71) Applicant: TSUDAKOMA KOGYO KABUSHIKI KAISHA, Ishikawa-ken (JP)

(72) Inventors: Ren Uenaka, Ishikawa-ken (JP); Takahisa Fujinaga, Ishikawa-ken (JP)

(73) Assignee: TSUDAKOMA KOGYO KABUSHIKI KAISHA, Ishikawa-Ken (JP)

( * ) Notice: Subject to any disclaimer, the term of this patent is extended or adjusted under 35 U.S.C. 154(b) by 204 days.

(21) Appl. No.: 17/360,676

(22) Filed: Jun. 28, 2021

(65) Prior Publication Data

US 2022/0009094 A1 Jan. 13, 2022

(30) Foreign Application Priority Data

Jul. 7, 2020 (JP) .................................. 2020-116814

(51) Int. Cl.
*B25J 9/16* (2006.01)
*B29C 70/38* (2006.01)
(Continued)

(52) U.S. Cl.
CPC ........... *B25J 9/1633* (2013.01); *B25J 9/0096* (2013.01); *B25J 11/00* (2013.01); *B29C 70/384* (2013.01);
(Continued)

(58) Field of Classification Search
CPC ........ B25J 9/0096; B25J 9/1633; B25J 11/00; B29C 70/384; B29C 70/388;
(Continued)

(56) References Cited

U.S. PATENT DOCUMENTS

| 2013/0111725 A1* | 5/2013 | Torres Martinez .... D04H 13/00 29/419.1 |
| 2014/0083620 A1* | 3/2014 | Caffiau ................. B29C 70/388 156/433 |

(Continued)

FOREIGN PATENT DOCUMENTS

| CN | 108422685 A | 8/2018 |
| EP | 2594389 A1 | 5/2013 |
| JP | 2019-130914 A | 8/2019 |

OTHER PUBLICATIONS

Dec. 6, 2021, European Search Report issued for related EP Application No. 21182454.5.

*Primary Examiner* — Dale Moyer (74) *Attorney, Agent, or Firm* — Paratus Law Group, PLLC (57) ABSTRACT

An automated fiber bundle placement apparatus including a placing head having a pressing device, and a multi-jointed robot. The pressing device includes a pressing part, a pressing mechanism having a drive device, and a drive control device. The drive control device includes a drive command unit configured to output a drive command corresponding to a contact width of a placement die with the pressing part, the contact width being a length in the width direction of a part of the placement die facing in parallel to a contact range of the pressing part during pressing against the placement die, and is configured to control drive of the drive device to apply a pressing force corresponding to the drive command to the pressing part.

1 Claim, 4 Drawing Sheets (51) Int. Cl.
*B25J 9/00* (2006.01)
*B65H 49/38* (2006.01)
*B25J 11/00* (2006.01)

(52) U.S. Cl.
CPC ........... *B29C 70/388* (2013.01); *B65H 49/38* (2013.01); *G05B 2219/45033* (2013.01); *G05B 2219/45053* (2013.01); *G05B 2219/45099* (2013.01); *G05B 2219/45238* (2013.01); *G05B 2219/45239* (2013.01)

(58) Field of Classification Search
CPC ........... G05B 2219/45033; G05B 2219/45053; G05B 2219/45099; G05B 2219/45238; G05B 2219/45239
See application file for complete search history.

(56) References Cited

U.S. PATENT DOCUMENTS

| | | |
|---|---|---|
| 2016/0114540 A1 | 4/2016 | Hamlyn et al. |
| 2019/0077094 A1* | 3/2019 | Ham ...................... B26D 1/065 |

* cited by examiner

FIG.2

MOVING DIRECTION OF
PLACING HEAD

AUTOMATED FIBER BUNDLE PLACEMENT APPARATUS

CROSS-REFERENCE TO RELATED APPLICATION

The present application claims priority from Japanese Patent Application No. 2020-116814, filed on Jul. 7, 2020, the entire subject matter of which is incorporated herein by reference.

TECHNICAL FIELD

The present invention relates to an automated fiber bundle placement apparatus including a supply device which a plurality of bobbins each having a fiber bundle wound thereon is mounted thereto and is configured to deliver the fiber bundle from each of the bobbins, a placing head configured to perform placement of each of the fiber bundles supplied from the supply device onto a placement die in a state of being aligned in a width direction and having a pressing device configured to press the fiber bundles on the placement die, and a multi-jointed robot which the placing head is attached thereto and is configured to move the placing head for the placement, wherein the pressing device includes a pressing part configured to be pressed against the placement die, a pressing mechanism including a drive device configured to apply a pressing force toward the placement die to the pressing part, and a drive control device configured to control drive of the drive device.

BACKGROUND ART

As an automated fiber bundle placement apparatus, known is an AFP (Automated Fiber Placement) apparatus configured to place a thin fiber bundle onto a placement die. Note that, as used herein, the "fiber bundle" indicates a material such as a so-called tow prepreg formed into a tape shape by impregnating a matrix resin in a bundle of a plurality of reinforced fibers (carbon fibers, glass fibers and the like). As the AFP apparatus, there is an apparatus configured to place a fiber bundle onto a placement die by using a multi-jointed robot.

JP2019-130914A discloses, as the AFP apparatus, an apparatus including an unwinding mechanism configured to unwind (deliver) fiber bundles from bobbins on which the fiber bundles are wound, and a sticking head as a placing head configured to place the fiber bundles in a state of being aligned in a width direction and attached to a multi-jointed robot. In the AFP apparatus of JP2019-130914A, the placing head (sticking head) has a pressing means as a pressing device for pressing the fiber bundle onto a placement die (a surface to be sticked), and the pressing means has a roller as a pressing part, a pressing member such as a shoe, and an air cylinder as a drive device configured to apply a pressing force toward the surface to be sticked to the pressing member.

SUMMARY OF INVENTION

In the AFP apparatus of the related art as described above, the pressing device is configured such that drive of the drive device is controlled to apply a predetermined pressing force to the pressing part. However, as for the placement die for performing the placement by using the AFP apparatus, even when a surface (placement surface) against which the pressing part is pressed for the placement is a planar surface, a width dimension of the placement die in the width direction is not always greater than a width dimension of the pressing part and may be smaller, in some cases. The placement surface of the placement die is not limited to the planar surface, and may be a convex curved surface formed such that a height in a pressing direction by the pressing part changes.

In this case, the pressing part that receives the predetermined pressing force from the drive device and is thus pressed against the placement die is in pressing contact with the placement die only at a part including a center, not at an entire part. For this reason, as pressed as described above, the pressing part is deformed only at the part in pressing contact with the placement die. A degree of the deformation is greater, as compared to a case where the pressing part is in pressing contact with the placement die (placement surface) over its entire width. Further, when the placement surface is a curved surface as described above, a force (reactive force) that is applied to the pressing part from the placement die (placement surface) is different in the width direction. As a result, a portion, which receives the greatest force in the width direction, of the part of the pressing part in pressing contact with the placement surface is further deformed.

When the placement accompanied by such deformation of the pressing part is repeatedly performed, a pressing surface of the pressing part may be deformed. In this case, since the fiber bundle cannot be properly pressed against the placement die (placement surface) during the placement after the deformation, a problem may occur in the placement, such as wrinkles generated in the fiber bundle arranged on the placement die.

It is therefore an object of the present invention to provide an automated fiber bundle placement apparatus capable of preventing a problem in the placement by driving the drive device to apply, to a pressing part, a pressing force corresponding to a width dimension of a placement die against which the pressing part is pressed.

A preamble of the present invention is an automated fiber bundle placement apparatus including a supply device which a plurality of bobbins each having a fiber bundle wound thereon is mounted thereto and is configured to deliver the fiber bundle from each of the bobbins, a placing head configured to perform placement of each of the fiber bundles supplied from the supply device onto a placement die in a state of being aligned in a width direction and having a pressing device configured to press the fiber bundles on the placement die, and a multi-jointed robot which the placing head is attached thereto and is configured to move the placing head for the placement, wherein the pressing device includes a pressing part configured to be pressed against the placement die, a pressing mechanism including a drive device configured to apply a pressing force toward the placement die to the pressing part, and a drive control device configured to control drive of the drive device.

In order to achieve the above object, the automated fiber bundle placement apparatus of the preamble of the present invention is characterized in that the drive control device includes a drive command unit configured to output a drive command corresponding to a contact width of the placement die with the pressing part, the contact width being a length in the width direction of a part of the placement die facing in parallel to a contact range of the pressing part during pressing to the placement die, and is configured to control drive of the drive device so as to apply the pressing force corresponding to the drive command to the pressing part.

According to the automated fiber bundle placement apparatus of the present invention, the drive control device is configured to control the drive of the drive device in the pressing mechanism configured to apply the pressing force toward the placement die to the pressing part so that the pressing force corresponding to the drive command of the drive command unit is applied to the pressing part. The drive control device is also configured to output the drive command corresponding to the contact width that is the width dimension of the placement die against which the pressing part is pressed.

Therefore, unlike the apparatus of the related art where the drive device applies the predetermined the pressing force to the pressing part, irrespective of the contact width, according to the drive control device, when the contact width is smaller than the width dimension of the pressing part, the pressing force that is applied to the pressing part is reduced according to the small contact width. In this way, even when the pressing part is in pressing contact with the placement die only at a part in the width direction, as described above, a degree of deformation of the part is reduced, as compared to the apparatus of the related art. As a result, even when the placement is repeatedly performed, shape deformation of the pressing surface of the pressing part is prevented as much as possible, so that it is possible to prevent the problem in the placement as described above.

DESCRIPTION OF EMBODIMENTS

Hereinbelow, an embodiment of the automated fiber bundle placement apparatus according to the present invention will be described with reference to FIGS. 1 to 3.

Figure 1:
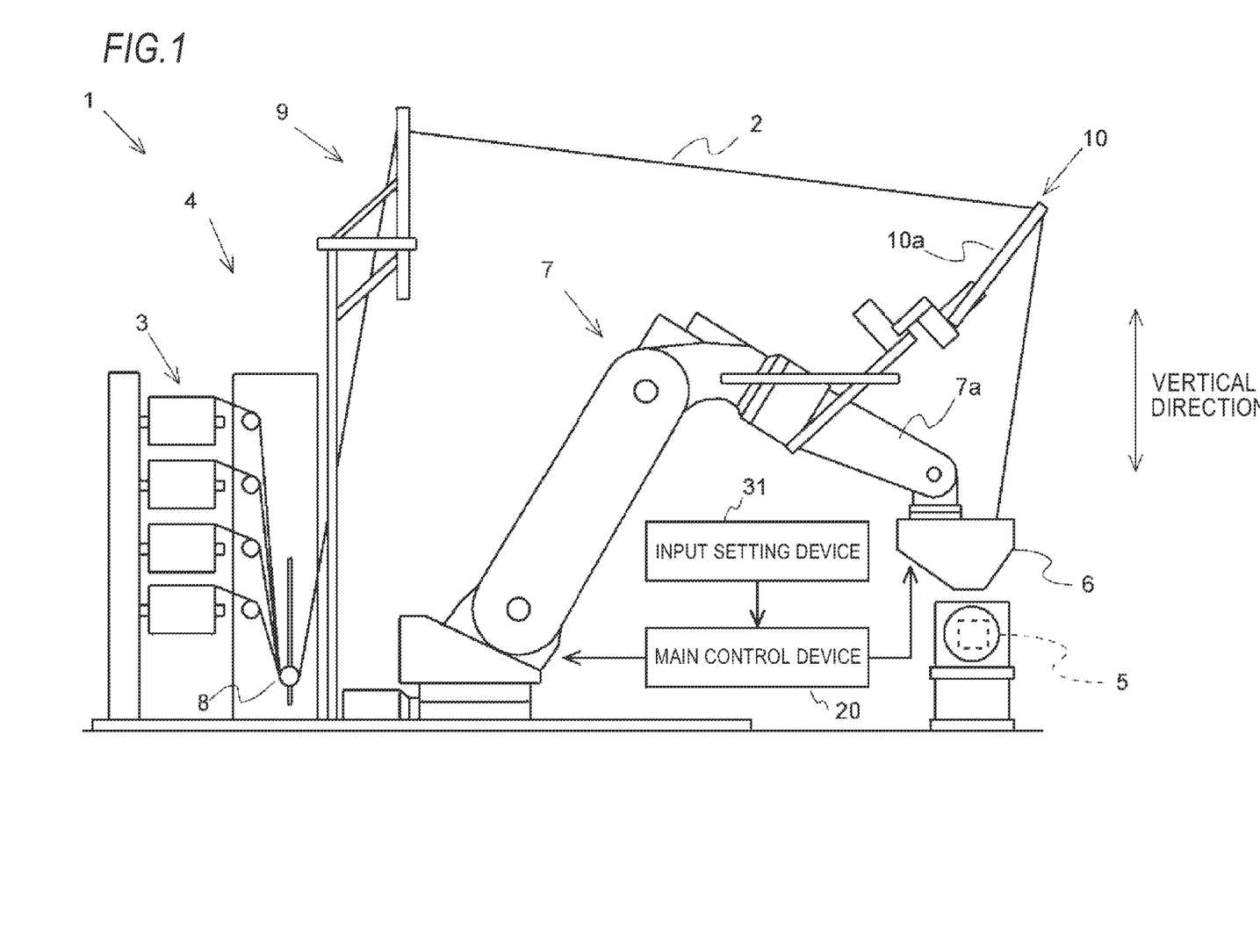
FIG. 1 is a side view showing an automated fiber bundle placement apparatus to which the present invention is applied.

As shown in FIG. 1, an automated fiber bundle placement apparatus 1 includes a supply device 4 to which bobbins 3 each having a fiber bundle 2 wound thereon is mounted thereto, a placing head 6 configured to perform placement of the fiber bundles 2 supplied from the supply device 4 onto a placement die 5, and a multi-jointed robot 7 configured to move the placing head 6 for the placement. Note that, in the present embodiment, the automated fiber bundle placement apparatus 1 is configured to perform the placement of the sixteen fiber bundles 2 at the same time. Therefore, although only the four bobbins on a front side are shown in FIG. 1, the sixteen bobbins 3 are mounted to the supply device 4.

The supply device 4 includes a guide unit 9 configured to guide the fiber bundle 2 unwound from each bobbin 3 toward the multi-jointed robot 7. The guide unit 9 has a guide member (not shown) provided for each fiber bundle 2 so as to individually guide each fiber bundle 2, and is configured to guide each fiber bundle 2 at a position higher than the multi-jointed robot 7 by the guide members. Note that, the supply device 4 is provided with a dancer roller 8 common to each of the fiber bundles 2, as a configuration for adjusting tension of each fiber bundle 2, in a path of the fiber bundle 2 between each bobbin 3 and the guide unit 9. By the configuration, each fiber bundle 2 is adjusted to have appropriate tension between the bobbin 3 and the guide unit 9, and is pulled toward the multi-jointed robot 7 in an appropriate tension state.

A guide mechanism 10 for guiding each fiber bundle 2 guided by the guide unit 9 as described above is attached to the multi-jointed robot 7. The guide mechanism 10 is attached to an arm 7a on a tip end-side of the multi-jointed robot 7. The guide mechanism 10 has a tow guide (not shown) provided for each fiber bundle 2 so as to individually guide each fiber bundle 2, and each tow guide is supported by a support member 10a. The guide mechanism 10 is provided such that the support member 10a extends upward above the arm 7a and each fiber bundle 2 is guided on a tip end-side of the support member 10a.

Therefore, in the automated fiber bundle placement apparatus 1, the fiber bundle 2 pulled out from each bobbin 3 is pulled out from the supply device 4 (guide unit 9) at a position higher than the multi-jointed robot 7 in a vertical direction, passes above the multi-jointed robot 7 and reaches the guide mechanism 10. Each fiber bundle 2 is turned in a form guided to the guide mechanism 10, and is guided to the placing head 6 attached to a tip end of the arm 7a of the multi-jointed robot 7.

Figure 2:
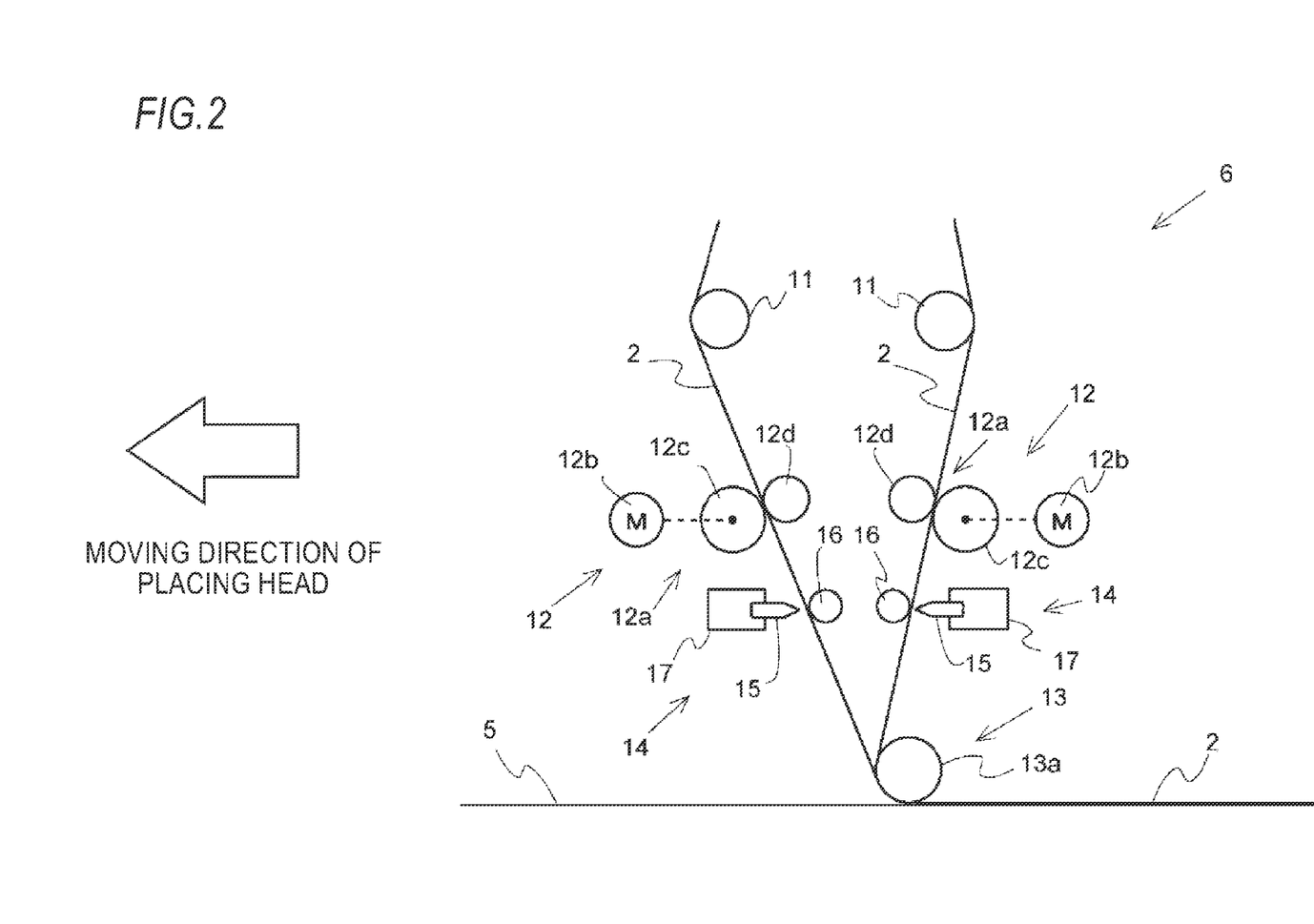
FIG. 2 shows a placing head of the automated fiber bundle placement apparatus.
Figure 3:
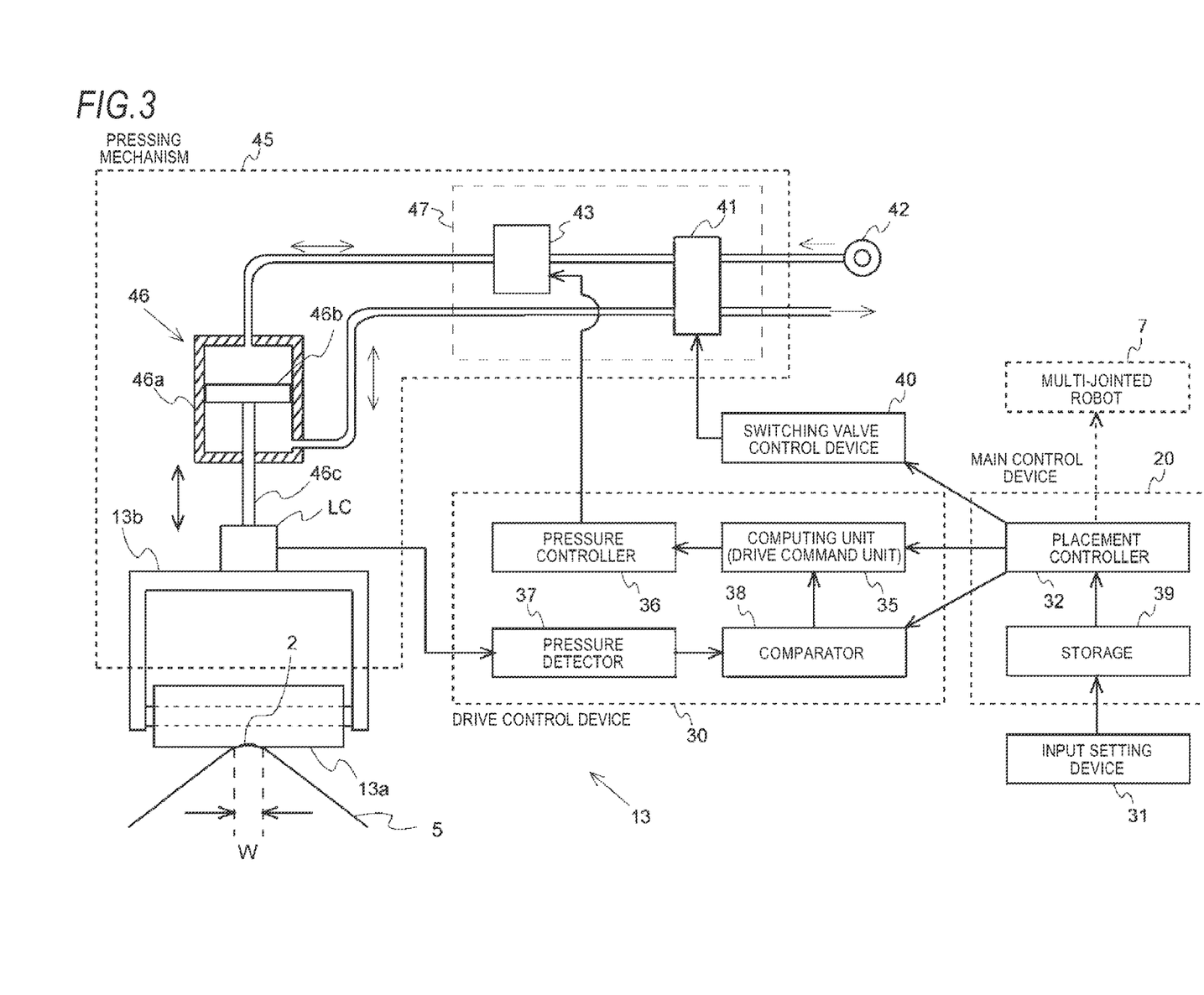
FIG. 3 shows a drive control device of the present invention.

As shown in FIG. 2, the placing head 6 has a pressing device 13 configured to press the fiber bundles 2 onto the placement die 5, delivery mechanisms 12 configured to deliver the fiber bundles 2 toward the pressing device 13, and cutting devices 14 configured to cut the fiber bundles 2 between the pressing device 13 and the delivery mechanism 12. In addition to the constitutional elements, the placing head 6 has guide rollers 11 provided above the delivery mechanism 12 and configured to guide the fiber bundles 2 toward the delivery mechanism 12.

As for the constitutional elements, the guide roller 11 is provided in such a form that an axis direction thereof coincides with a width direction of the placing head 6. As described above, in the present embodiment, in order to allot the sixteen fiber bundles 2 guided to the placing head 6 into two groups, the two guide rollers 11 are provided at different positions in a front and rear direction (a direction that coincides with a direction in which the fiber bundles 2 are placed onto the placement die 5) by the placement. Each fiber bundle 2 is allotted and guided to any one guide roller 11, so that, in the placing head 6, the sixteen fiber bundles 2 are allotted to two groups and guided by the guide rollers 11 at different positions in the front and rear direction and reach the delivery mechanism 12.

Note that, each group of the fiber bundles 2 is composed of the eight fiber bundles 2 because the sixteen fiber bundles 2 are equally divided. Therefore, the paths by the sixteen fiber bundles 2 become eight paths at each of the two positions different in the front and rear direction. The path of each fiber bundle 2 in the placing head 6 reaches the delivery mechanism 12 via the guide roller 11 corresponding to the fiber bundle 2.

The delivery mechanism 12 includes a conveying mechanism 12a provided on each path of the fiber bundle 2, and a drive motor 12b provided for each conveying mechanism 12a and configured to rotationally drive the conveying mechanism 12a. In the present embodiment, each conveying mechanism 12a is constituted by a pair of rollers 12c and 12d provided to nip the fiber bundle 2. Each conveying mechanism 12a is configured such that as one (the roller 12c, in the shown example) of the pair of rollers 12c and 12d is rotationally driven by the drive motor 12b, the other is accordingly driven, thereby conveying the fiber bundle 2 toward the pressing device 13.

The pressing device 13 has a pressing part 13*a* configured to press the fiber bundle 2 onto the placement die 5 and to be pressed toward the placement die 5. Note that, in the present embodiment, the pressing part 13*a* is a so-called compaction roller that is a roller-shaped member provided to be rotatable. The pressing part (compaction roller) 13*a* is provided such that an axis direction thereof coincides with the width direction, similar to the guide roller 11. However, the pressing part (compaction roller) 13*a* is provided as a single pressing part common to all the fiber bundles 2. Therefore, the paths of the fiber bundles 2 of the two groups sent from the delivery mechanisms 12 join at the pressing part 13*a*. Each fiber bundle 2 guided to the pressing part 13*a* along the paths is aligned in the width direction at the pressing part 13*a*.

The cutting device 14 includes a cutting blade 15 provided on each path of the fiber bundles 2, a fixed member 16 provided to locate the path between the fixed member 16 and the cutting blade 15, and a cutting blade drive mechanism 17 provided for each cutting blade 15 and configured to cause the cutting blade 15 to perform a cutting operation of cutting the fiber bundle 2. Note that, the cutting blade 15 is provided such that an extension direction of a blade edge thereof is parallel to the axis direction of the pressing part 13*a* and substantially orthogonal to a traveling direction of the fiber bundle 2. In the present embodiment, the fixed member 16 is a so-called anvil roller that is a roller-shaped member provided to be rotatable, and is provided on each path of the cutting blade 15 (the path of the fiber bundle 2). The cutting device 14 is configured to cut the fiber bundle 2 in cooperation with the cutting blade 15 and the fixed member 16 by the cutting operation of the cutting blade 15 by the cutting blade drive mechanism 17.

As shown in FIG. 1, the automated fiber bundle placement apparatus 1 also includes a main control device 20. Note that, the main control device 20 is provided accommodated in a control box (not shown) provided for the automated fiber bundle placement apparatus 1. The automated fiber bundle placement apparatus 1 is configured such that operations of the multi-jointed robot 7 for executing the placement and each unit of the placing head 6 attached to the multi-jointed robot 7 are controlled by the main control device 20. Therefore, operations of the delivery mechanisms 12 (conveying mechanisms 12*a*), the pressing device 13 and the cutting devices 14 provided for the placing head 6 are also controlled by the main control device 20.

Note that, operations of each unit are controlled according to a predetermined operation program. As shown in FIG. 3, the main control device 20 includes a storage 39 in which the operation program is stored, and a placement controller 32 connected to the storage 39 and configured to execute the control. The operation program is set by an input setting device 31 connected to the storage 39, for example.

In the automated fiber bundle placement apparatus configured as described above, the pressing device includes, in addition to the pressing part 13*a*, a pressing mechanism including a drive device configured to apply a pressing force toward the placement die to the pressing part 13*a*, and a drive control device configured to control drive of the drive device. In the present invention, the drive control device includes a drive command unit configured to output a drive command corresponding to a contact width of the placement die with the pressing part 13*a*, and is configured to control drive of the drive device to apply the pressing force corresponding to the drive command to the pressing part 13*a*. Note that, the contact width is a length in the width direction of a part facing in parallel to a contact range of the pressing part during pressing against the placement die. An embodiment (the present embodiment) of the automated fiber bundle placement apparatus is described in detail with reference to FIG. 3.

In the pressing device 13, a pressing mechanism 45 has an air cylinder 46, as the drive device. The pressing mechanism 45 also includes an arm 13*b* supported by a rod 46*c* of the air cylinder 46 and configured to rotatably support the pressing part 13*a*, a compressed air supply mechanism 47 for controlling supply of a compressed air to the air cylinder 46, and a load cell LC provided between the air cylinder 46 and the arm 13*b* and configured to detect the pressing force that is applied to the pressing part 13*a*.

Note that, in the present embodiment, the air cylinder 46 is a so-called double-acting type air cylinder, and is constituted by a cylindrical cylinder 46*a* and a piston 46*b* accommodated in the cylinder 46*a* and attached to the rod 46*c*. The air cylinder 46 is provided in the placing head 6 in such an aspect that the cylinder 46*a* is supported to a frame (not shown) of the placing head 6 by a proper bracket or the like. In such a state, the air cylinder 46 is set in a state where a longitudinal direction of the rod 46*c* coincides with a vertical direction of the placing head 6 and the rod 46*c* is directed downward.

The compressed air supply mechanism 47 includes a switching valve 41 configured to switch a supply destination of the compressed air, and is configured such that a supply source 42 of the compressed air is connected to one pressure chamber and the other pressure chamber with respect to the piston 46*b* of the cylinder 46*a* of the air cylinder 46 via the switching valve 41. In the compressed air supply mechanism 47, a pressure-regulating valve 43 configured to regulate a pressure of the compressed air to be supplied is provided in a pipeline for connecting the switching valve 41 and the one pressure chamber. The switching valve 41 is connected to a switching valve control device 40 configured to control drive of the switching valve 41.

The switching valve control device 40 is connected at its input terminal to the placement controller 32 of the main control device 20 and is connected at its output terminal to the switching valve 41. The switching valve control device 40 is configured to control drive of the switching valve 41 according to a command signal from the placement controller 32. When a command signal (lowering command signal) for moving down the pressing part 13*a* is output from the placement controller 32, the switching valve control device 40 drives the switching valve 41 so that the compressed air is supplied to the one pressure chamber of the air cylinder 46.

In this way, the rod 46*c* is moved down by the pressure of the compressed air, and accordingly, the pressing part 13*a* supported by the arm 13*b* is in pressing contact with the placement die 5. Specifically, the air cylinder 46 applies a pressing force corresponding to the pressure to the pressing part 13*a*, thereby causing the pressing part 13*a* to be in pressing contact with the placement die 5. Therefore, in a case where the fiber bundle 2 is placed on the placement die 5, the fiber bundle 2 is pressed with a pressing force corresponding to the pressing force by the pressing part 13*a*. The pressing force is detected by the load cell LC provided between the rod 46*c* and the arm 13*b*. The load cell LC is connected to the drive control device 30, and is configured to output a signal (detection signal) corresponding to the detected pressing force to the drive control device 30.

The drive control device 30 is accommodated in the control box, together with the main control device 20. The drive control device 30 is connected at its input terminal to the placement controller 32 of the main control device 20. The drive control device 30 is also connected to the load cell LC. The drive control device 30 is also connected at its output terminal to the pressure-regulating valve 43. The drive control device 30 includes, as constitutional elements thereof, a computing unit 35 configured to output a drive command for driving the air cylinder 46, and a pressure controller 36 configured to control drive of the pressure-regulating valve 43 based on the drive command. The drive control device 30 also includes a pressing force detector 37 configured to obtain a detected value of the pressing force from the detection signal output from the load cell LC and a comparator 38 configured to compare the detected value of the pressing force and a predetermined the setting value of the pressing force, so as to correct the drive command based on the detected value of the pressing force. The constitutional elements are specifically described.

The computing unit 35 is connected at its input terminal to the placement controller 32. The computing unit 35 is also connected at its output terminal to the pressure controller 36. The computing unit 35 is configured to output, based on a setting pressing force value that is a setting value of the pressing force, a drive command corresponding to the setting pressing force value to the pressure controller 36.

Note that, in the present embodiment, it is assumed that the setting pressing force value is set in a form of being included in the operation program. More specifically, in the automated fiber bundle placement apparatus 1, as described above, the operation control of the multi-jointed robot 7 and each unit of the placing head 6, which is performed for the placement by the main control device 20, is executed according to the predetermined operation program. Specifically, a series of operations set in the operation program are sequentially executed by the multi-jointed robot 7 and each unit of the automated fiber bundle placement apparatus 1, so that the placement is continuously executed.

Therefore, in the operation program, operation information for each operation of a series of operations of the automated fiber bundle placement apparatus 1 is set in operation order, and each operation information includes operation conditions for operating the multi-jointed robot 7 and each unit. Note that, examples of the operation information include operation information (placing operation information) for causing the automated fiber bundle placement apparatus 1 to perform the placement, and operation information (moving operation information) for moving the placing head 6 to a position in which the placement starts, and the like for the placement.

Each placing operation information set in the operation program includes the setting pressing force value. The setting pressing force value is also set to a value corresponding to the contact width at the time of performing the placement by the placing operation information. Specifically, when determining the operation condition of the placing operation information, the operation condition is determined based on that the placement is to be performed in what range for which part of the placement die 5. Therefore, the contact width at the time of performing the placement with the operation condition is of course perceived in advance. Hence, after obtaining the setting pressing force values corresponding to each of the contact widths in the placements by each of the operation conditions, each placing operation information is set so that each of the obtained setting pressing force values is included together with the corresponding operation condition.

As for the placing operation information, the one placement, more specifically, the continuous placement (herein-below, referred to as "(the) unit placement") from a tip end of the fiber bundle 2 (a cut end on a supply side in the previous placement) to a cut end by cutting in the placement is not limited to placement that is performed in a state where the contact width is the same. For example, the contact width may change during the unit placement. However, as described above, the placing operation information includes the setting pressing force value, and the setting pressing force value corresponds to the contact width. Therefore, the unit placement where the contact width changes during the placement is performed by operations of the multi-jointed robot 7 and each unit, which are executed based on a plurality of placing operation information in which the setting pressing force values are different. Specifically, the placing operation information including the setting pressing force value is set in a unit of the contact width (setting pressing force value), not a unit of the unit placement.

Note that, as used herein, the contact width is a length in the width direction, and is a length (W denoted in FIG. 3) of a part facing in parallel to a contact range of the pressing part 13a of a range of the placement die 5 facing the pressing part 13a during pressing to the placement die 5 (during the placement).

Specifically, in a case where a part of the placement die 5 on which the placement is performed is a planar surface, a length (width dimension) in the width direction of a part of the placement die 5 to contact the pressing part 13a is the same as the width dimension of a part of the placement die 5 facing the pressing part 13a. On the other hand, in a case where the part of the placement die 5 on which the placement is performed is a curved surface, the width dimension of a part of the placement die 5 to contact the pressing part 13 is smaller than the width dimension of a part of the placement die 5 facing the pressing part 13a. However, in any case, a part of the placement die 5 to contact the pressing part 13a is a part within a range parallel to a part, which is to be deformed by pressing, of the pressing surface of the pressing part 13a. Therefore, as described above, the contact width is the width dimension of a part of the placement die 5 facing in parallel to a contact range of the pressing part 13a.

As described above, the setting pressing force value is set to a value corresponding to the contact width. More specifically, the setting pressing force value is set to a value that is larger (smaller) as the contact width is larger (smaller). Additionally describing, the value is set by a method of performing a test and the like in advance and confirming a degree of deformation of the pressing part 13a with respect to the setting pressing force value.

The placing operation information including the setting pressing force value set as described above is stored in the storage 39 of the main control device 20 in an aspect of being set in the operation program. Note that, the placement controller 32 of the main control device 20 is configured to sequentially read out, in the set operation order, each operation information (the placing operation information and the moving operation information) set in the operation program from the storage 39 and to control drive of a motor provided for each unit in the multi-jointed robot 7 according to the operation condition set in each operation information, when executing the placement. In addition, when the read operation information is the placing operation information, the placement controller 32 outputs a setting pressing force signal corresponding to the setting pressing force value set in the placing operation information to the computing unit 35.

When the setting pressing force signal is output from the placement controller 32, the computing unit 35 stores, in an embedded memory (not shown), the setting pressing force value indicated by the signal. The computing unit 35 is also configured to output a signal (drive command signal) of a drive command corresponding to the stored setting pressing force value to the pressure controller 36. In this way, in the present embodiment, the computing unit 35 is configured to output the drive command (signal) corresponding to the setting pressing force value where a value corresponding to the contact width is set. Therefore, the computing unit 35 corresponds to the drive command unit of the present invention.

The pressure controller 36 is connected at its output terminal to the pressure-regulating valve 43. The pressure controller 36 is configured to control the pressure-regulating valve 4 based on the drive command signal from the computing unit 35.

Note that, the pressure-regulating valve 43 is a so-called electropneumatic proportional valve, and is configured to regulate a pressure of the compressed air that is supplied to the air cylinder 46, according to a magnitude (voltage) of an input signal. Therefore, after obtaining in advance a relationship between the pressing force that is applied by the pressing part 13a by the air cylinder 46 and the compressed air that is supplied to the air cylinder 46, a magnitude (voltage value) of a signal (control signal) that is output to the pressure-regulating valve 43 is set in advance in the pressure controller 36 in an aspect corresponding to each setting pressing force value set in the operation program. The pressure controller 36 is also configured to output, to the pressure-regulating valve 43, a control signal of a magnitude corresponding to a setting pressing force value indicated by a drive command signal each time the drive command signal is input from the computing unit 35. In this way, the compressed air of a pressure corresponding to the setting pressing force value set for each placement (placing operation information) is supplied to the air cylinder 46, so that the air cylinder 46 applies the pressing force toward the placement die 5 to the pressing part 13a.

By the configuration of the drive control device 30 (the computing unit 35 and the pressure controller 36) as described above, the drive of the air cylinder 46 (the operating state of the pressure-regulating valve 43) is controlled to apply, to the pressing part 13a, the pressing force corresponding to the setting pressing force value set in the placing operation information. In the meantime, even when the air cylinder 46 (pressure-regulating valve 43) is controlled in this way, the air cylinder 46 may not apply the pressing force corresponding to the setting pressing force value to the pressing part 13a due to influences of disturbance and the like. Therefore, the drive control device 30 is configured to correct the drive command of the drive command signal that is output from the computing unit 35 as described above, based on the detected actual pressing force value, and includes the pressing force detector 37 and the comparator 38 for that purpose.

The pressing force detector 37 is connected at its input terminal to the load cell LC and is also connected at its output terminal to the comparator 38. The pressing force detector 37 is configured to obtain a pressing force at the time of detection by the load cell LC based on the detection signal output from the load cell LC with a predetermined cycle (for example, every 50 msec), and to output a signal (detection pressing force signal) corresponding to the obtained pressing force to the comparator 38.

The comparator 38 is also connected at its input terminal to the placement controller 32, in addition to the pressing force detector 37. The comparator 38 is also connected at its output terminal to the computing unit 35. The comparator 38 is configured to compare a detected pressing force value, which is a value of the pressing force indicated by the detection pressing force signal, and the setting pressing force value and to obtain a deviation thereof each time the detection pressing force signal is output from the pressing force detector 37. Note that, as for the setting pressing force value, the placement controller 32 is also configured to output the setting pressing force signal to the comparator 38 as the setting pressing force signal is output to the computing unit 35, as described above. Further, it is assumed that the comparator 38 is configured to store, in an internal memory (not shown), the setting pressing force value indicated by the setting pressing force signal, based on the setting pressing force signal output from the placement controller 32.

The comparator 38 is also configured to output a deviation signal indicative of the deviation to the computing unit 35 after obtaining the deviation. The deviation signal includes a magnitude of the deviation and a direction of the deviation (the deviation is a plus or minus direction; when the detected pressing force value is greater than the setting pressing force value, the deviation is a plus direction, and otherwise, the deviation is a minus direction). When the deviation is zero, the comparator 38 does not output the deviation signal to the computing unit 35.

When the deviation signal is output from the comparator 38, the computing unit 35 corrects the drive command that is output to the pressure controller 36, based on the magnitude and direction of the deviation included in the deviation signal.

More specifically, an arithmetic equation for obtaining a correction value that is used for correction of the drive command based on the magnitude of the deviation included in the deviation signal is set in advance in the computing unit 35. The computing unit 35 is also configured to obtain the correction value by using the arithmetic equation, as the deviation signal is input. The computing unit 35 is also configured to correct the drive command by adding or subtracting the correction value with respect to the value (drive command value) indicated in the drive command, according to the direction of the deviation included in the deviation signal. Specifically, when the direction of the deviation is a plus direction, the computing unit 35 subtracts the correction value from the drive command value, and when the direction of the deviation is a minus direction, the computing unit 35 adds the correction value to the drive command value. The computing unit 35 is also configured to output a drive command (signal) corresponding to the corrected drive command value to the pressure controller 36.

When the drive command signal indicative of the corrected drive command (drive command value) is input, the pressure controller 36 outputs a control signal of a magnitude corresponding to the corrected drive command value to the pressure-regulating valve 43. Note that, in the pressure controller 36, in addition to each setting pressing force value, a magnitude of the control signal is preset in an aspect corresponding to the corrected drive command value. The pressure-regulating valve 43 is actuated according to the magnitude of the control signal, so that the pressure of the compressed air to be supplied to the air cylinder 46 is regulated according to the drive command value and the pressing force applied to the pressing part 13a by the air cylinder 46 has a magnitude corresponding to the corrected drive command (drive command value).

The operations of the automated fiber bundle placement apparatus 1 of the present embodiment including the drive control device 30 as described above are described as follows.

In the automated fiber bundle placement apparatus 1, as described above, the operations of the multi-jointed robot 7 and each unit of the placing head 6 are controlled according to the operation program including the moving operation information and the placing operation information, and the placement of the fiber bundle 2 is executed according to the placing operation information. In the placement, when the placing operation information is read out by the placement controller 32, the placement controller 32 outputs the setting pressing force signal corresponding to the setting pressing force value set in the placing operation information to the computing unit 35 and the comparator 38 of the drive control device 30. In this way, the setting pressing force value is stored in the internal memories of the computing unit 35 and the comparator 38.

The placement controller 32 outputs the lowering command signal to the switching valve control device 40 at the same time as outputting the setting pressing force signal. In this way, the switching valve control device 40 drives the switching valve 41 so that the compressed air from the supply source 42 is supplied to the one pressure chamber of the air cylinder 46. In this way, the switching valve 41 communicates with the one pressure chamber, and supplies the compressed air from the supply source 42 to the pipeline in which the pressure-regulating valve 43 is interposed.

In the drive control device 30, when the setting pressing force signal is input to the computing unit 35, as described above, the computing unit 35 outputs the drive command signal corresponding to the setting pressing force value to the pressure controller 36. Then, the pressure controller 36 outputs a control signal of a magnitude corresponding to the setting pressing force value indicated in the drive command signal to the pressure-regulating valve 43. In this way, the pressure-regulating valve 43 is in an operating state corresponding to the magnitude of the control signal, so that the pressure of the compressed air from the supply source 42 is regulated to a pressure corresponding to the setting pressing force value. As a result, the air cylinder 46 is in a state of applying the pressing force corresponding to the setting pressing force value to the pressing part 13a, so that the pressing part 13a is moved down and is in pressing contact with the placement die 5.

The placement controller 32 starts to move the placing head 6 in the pressing contact state, so that the placement is started. Note that, while the placement is performed, the pressing force detector 37 obtains a pressing force at the time of detection by the load cell LC, based on the detection signal output from the load cell LC, and outputs the detection pressing force signal corresponding to the pressing force to the comparator 38. When the detection pressing force signal is input, the comparator 38 compares a pressing force (detected pressing force value) indicated by the detection pressing force signal and the setting pressing force value stored in the memory to obtain the deviation. In a case where the deviation is not zero (0), the comparator 38 outputs the deviation signal indicative of the deviation to the computing unit 35.

When the deviation signal is input, the computing unit 35 obtains a correction amount (correction value) of the drive command from the magnitude of the deviation included in the deviation signal, and corrects the drive command based on the correction value and the direction of the deviation. In this way, the drive command signal that is output from the computing unit 35 to the pressure controller 36 becomes a signal of the corrected drive command. Accordingly, the control signal that is output from the pressure controller 36 is changed to a signal corresponding to the drive command indicated in the drive command signal, and the operating state of the pressure-regulating valve 43 is changed to a state corresponding to the control signal (drive command value). In this way, the pressure of the compressed air that is supplied to the air cylinder 46 becomes a pressure corresponding to the corrected drive command value, and the pressing force that is applied to the pressing part 13a by the air cylinder 46 is changed.

Additionally describing, when the deviation is a plus deviation, i.e., when the detected pressing force value is greater than the setting pressing force value, correction of subtracting the correction value from the drive command value before correction is performed. As a result, control of lowering the pressing force to be applied to the pressing part 13a is executed. When the deviation is a minus deviation, i.e., when the detected pressing force value is smaller than the setting pressing force value, correction of adding the correction value to the drive command value before correction is performed. As a result, control of increasing the pressing force to be applied to the pressing part 13a is executed.

Since the pressing force detector 37 obtains the pressing force, which is applied to the pressing part 13a, with the cycle, the comparison of the detected pressing force value and the setting pressing force value by the comparator 38 is also performed with the cycle. The cycle is set to a cycle of a very short period, such as every 50 msec exemplified in the above. Therefore, even when a deviation occur between the detected pressing force value and the setting pressing force value, the above-described control of removing the deviation is executed in the short period, so that the pressing force to be applied to the pressing part 13a is substantially kept as the pressing force set to the setting pressing force value.

Note that, when the contact width changes during the unit placement, i.e., when the unit placement is performed based on the plurality of placing operation information where the setting pressing force values are different, the above-described control is executed in each placement based on each placing operation information.

As described above, according to the automated fiber bundle placement apparatus 1 based on the present invention, in the drive control device 30, the pressing force that is applied to the pressing part 13a is controlled based on the setting pressing force value set in the aspect corresponding to the contact width. In this way, even when the contact width is small, the pressing force corresponding to the contact width is applied to the pressing part 13a. Therefore, as compared to the apparatus of the related art where a predetermined pressing force is applied to the pressing part, irrespective of the contact width, it is possible to prevent a degree of deformation of the pressing part 13a from increasing.

According to the automated fiber bundle placement apparatus 1 of the present embodiment, the pressing mechanism 45 of the pressing device 13 includes the load cell LC for detecting the pressing force that is applied to the pressing part 13a, and the drive control device 30 can change the pressing force that is applied to the pressing part 13a by the air cylinder 46, based on a result of the detection. In this way, even when a state where the air cylinder 46 applies the pressing force to the pressing part 13a is changed due to influences of disturbance and the like, the pressing force corresponding to the setting pressing force value can be applied to the pressing part 13a.

Note that, the present invention is not limited to the above embodiment, and can also be implemented in following modified embodiment forms.

(1) As for the drive device of the pressing mechanism, the drive device of the above embodiment is the air cylinder 46. However, the drive device included in the pressing mechanism of the automated fiber bundle placement apparatus of the preamble of the present invention is not limited to the air cylinder. For example, as shown in FIG. 4, a combination of a motor and a ball screw mechanism can also be used.

Figure 4:
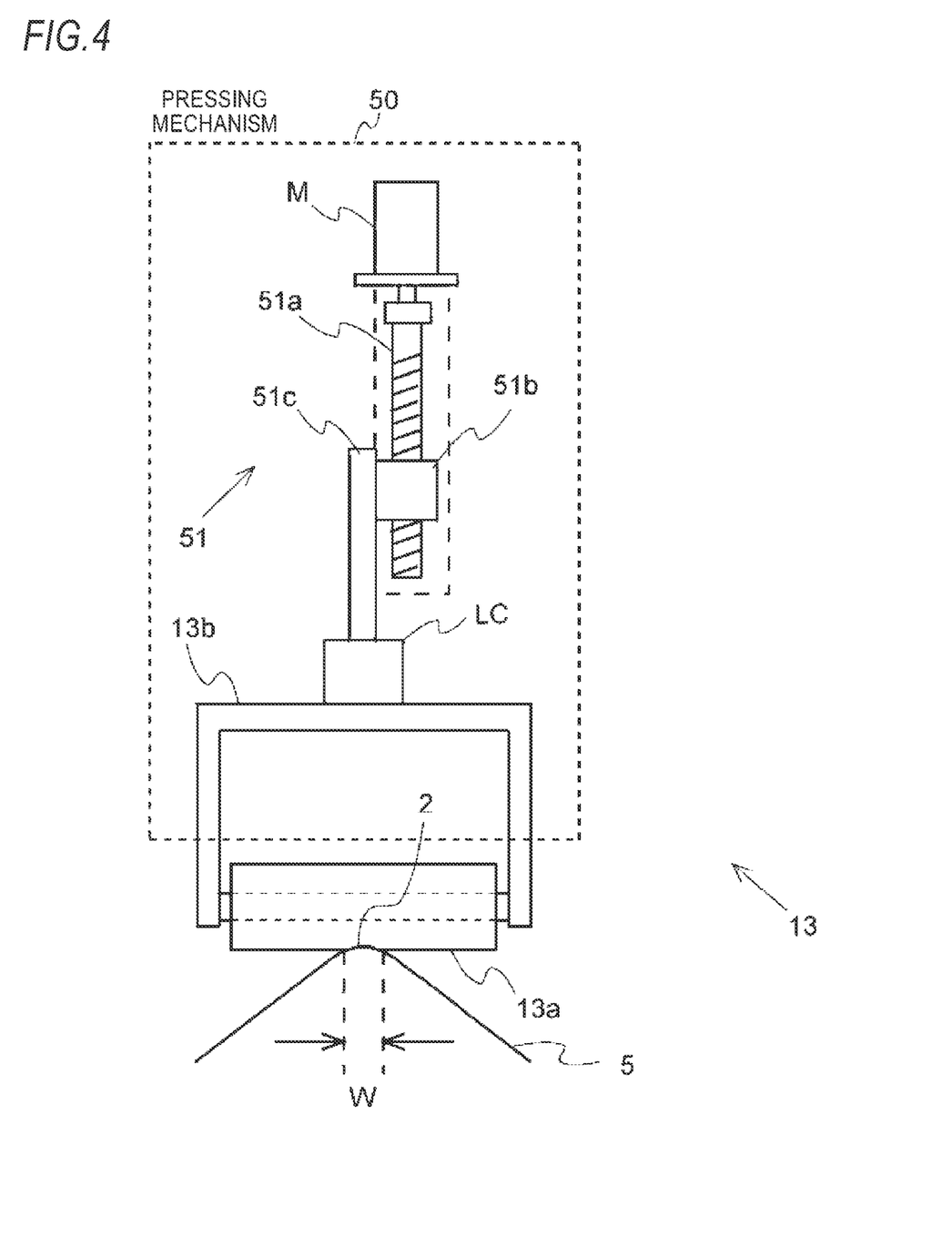
FIG. 4 shows another example of the drive device.

In a pressing mechanism 50 shown in FIG. 4, a screw shaft 51a of a ball screw mechanism 51 is fixed to a drive motor M as a drive source and the screw shaft 51a is rotationally driven by the drive motor M, so that a nut bracket 51b screwed to the screw shaft 51a is displaced in the vertical direction. In the pressing mechanism 50, the arm 13b configured to support the pressing part 13a is attached to the nut bracket 51b via a support member 51c.

The pressing mechanism 50 is also configured such that a magnitude of the pressing force to be applied to the pressing part 13a is adjusted by controlling a magnitude of the drive torque that is generated by the drive motor M. Note that, the magnitude of the drive torque by the drive motor M is determined by a magnitude of current (value) that is supplied to the drive motor M. Therefore, although not shown, it is assumed that the drive control device has a motor controller configured to adjust a magnitude of the current value that is supplied to the drive motor M, according to the setting pressing force value set in the operation program. In this way, the current of a magnitude corresponding to the setting pressing force value is supplied to the drive motor M, and the drive motor M generates the drive torque corresponding to the magnitude of the current. As a result, the ball screw mechanism 51 applies, to the pressing part 13a, a pressing force corresponding to the magnitude of the drive torque, i.e., a pressing force corresponding to the setting pressing force value set according to the contact width.

(2) As for the drive control device, in the above embodiment, the setting pressing force value corresponding to the contact width is set in the operation program stored in the main control device 20, and the drive control device 30 is configured such that the computing unit 35 corresponding to the drive command unit outputs the drive command based on the predetermined setting pressing force value. However, the drive control device of the present invention is not limited to such configuration. For example, the drive command unit may be configured to obtain a value of the pressing force (pressing force value) that is applied to the pressing part based on the contact width detected by a sensor or the like, and to output the drive command based on the obtained pressing force value.

(3) As for the configuration for executing the control of the pressing mechanism, in the above embodiment, the pressing mechanism 45 includes the load cell LC for detecting an actual pressing force that is applied to the pressing part 13a, and the drive control device 30 includes the pressing force detector 37 configured to obtain the detected pressing force value from the detection signal output from the load cell LC, and the comparator 38 configured to obtain a deviation between the detected pressing force value and the setting pressing force value. The drive control device 30 is also configured such that the computing unit 35 as the drive command unit corrects the drive command based on the deviation. However, in the present invention, the drive control device is not limited to the configuration of correcting the drive command based on the detected pressing force value. For example, in a case where the influences of disturbance and the like are small, the pressing force detector and the comparator may not be provided, and only the drive command corresponding to the predetermined setting pressing force value (alternatively, the pressing force value obtained as described above) may be output. In this case, the configuration (load cell) for detecting the pressing force in the pressing mechanism can also be omitted.

Note that, the present invention is not limited to the above-described examples, and can be changed as appropriate without departing from the gist thereof

What is claimed is:

1. An automated fiber bundle placement apparatus comprising a supply device which a plurality of bobbins each having a fiber bundle wound thereon is mounted thereto and is configured to deliver the fiber bundle from each of the bobbins, a placing head configured to perform placement of each of the fiber bundles supplied from the supply device onto a placement die in a state of being aligned in a width direction and having a pressing device configured to press the fiber bundles onto the placement die, and a multi-jointed robot which the placing head is attached thereto and is configured to move the placing head for the placement, wherein the pressing device comprises a pressing part configured to be pressed against the placement die, a pressing mechanism including a drive device configured to apply a pressing force toward the placement die to the pressing part, and a drive control device configured to control drive of the drive device, the automated fiber bundle placement apparatus being characterized in that the drive control device comprises a drive command unit configured to output a drive command corresponding to a contact width of the placement die with the pressing part, the contact width being a length in the width direction of a part of the placement die facing in parallel to a contact range of the pressing part during pressing against the placement die, and is configured to control drive of the drive device to apply the pressing force corresponding to the drive command to the pressing part.

* * * * *